(12) United States Patent
DiSanto (10) Patent No.: US 7,645,354 B1
(45) Date of Patent: Jan. 12, 2010

(54) AUDIO DEVICE HAVING DENSE SOUND ENHANCING COMPONENT

(76) Inventor: Robert DiSanto, 5755 Rahl St., Naples, FL (US) 34109

( * ) Notice: Subject to any disclaimer, the term of this patent is extended or adjusted under 35 U.S.C. 154(b) by 0 days.

(21) Appl. No.: 10/903,159

(22) Filed: Jul. 30, 2004

Related U.S. Application Data

(60) Provisional application No. 60/491,058, filed on Jul. 30, 2003.

(51) Int. Cl.
*B32B 38/10* (2006.01)
(52) U.S. Cl. ......................... 156/153; 156/322; 156/282
(58) Field of Classification Search ................ 156/153, 156/322, 282, 499, 498, 80; 312/140.3; 125/1
See application file for complete search history.

(56) References Cited

U.S. PATENT DOCUMENTS

| | | | | |
|---|---|---|---|---|
| 3,878,030 A | * | 4/1975 | Cook | ........................... 428/45 |
| 3,915,935 A | * | 10/1975 | Abraham et al. | ............... 528/66 |
| 4,810,533 A | * | 3/1989 | Smith | ........................... 427/292 |
| 5,004,512 A | * | 4/1991 | Fodera | ........................ 156/153 |
| 5,253,932 A | * | 10/1993 | Nesovic | .................... 312/140.3 |
| 5,267,499 A | * | 12/1993 | Othon | ........................... 84/291 |
| 5,597,627 A | * | 1/1997 | Lindeberg | ..................... 428/15 |
| 6,286,215 B1 | * | 9/2001 | Panaccione | .................. 30/169 |
| 6,296,902 B1 | * | 10/2001 | Parra Soriano | .............. 427/180 |

* cited by examiner

*Primary Examiner*—John L Goff
*Assistant Examiner*—Daniel McNally
(74) *Attorney, Agent, or Firm*—The Livingston Firm; Edward M. Livingston, Esq.; Bryan L. Loeffler, Esq.

(57) ABSTRACT

A musical instrument having strings, a wooden body and a granite veneer bonded to the wooden body. The granite has a density of at least 1.7 thousand kilograms per cubic meter and optionally can have a thickness in the range from about $7/64^{th}$ of an inch to $44/64^{th}$ of an inch. The musical instrument can be a having a granite sound board that is solid granite or a laminate of granite and wood. Additionally, the musical instrument can be a stringed instrument such as a guitar, bass, violin, viola, dulcimer or cello.

7 Claims, 4 Drawing Sheets

| | Metric Test | | | | | | |
|---|---|---|---|---|---|---|---|
| Name | Absorption by weight (%) | Density (kg/m3) | Modulus of Rupture (psi) | Compressive Strength (psi) | Abrasion Resistance hardness | Flexural Strength (psi) | Coeff. Thermal Expansion |
| Academy Black | 0.12 | 2,925 | | 29,000 | | | |
| Dakota Granite | 0.106 | Na | 2,820 | 22,500 | 57.09 | 1,598 | Na |
| Rainbow | 0.04 | 2,701 | 3,100 | 33,650 | Na | Na | Na |
| Texas Red | 0.10 | 2,627 | 1,515 | 19,950 | | | |

FIGURE 6

| | ASTM Test | | | | | | | |
|---|---|---|---|---|---|---|---|---|
| Name | Absorption by weight (%) | Specific Gravity (kg/m3) | Modulus of Rupture (MPa) | Compressive Strength (MPa) | Abrasion Resistance (mm) | Flexural Strength (MPa) | Porosity (%) | Coeff. Thermal Expansion |
| African Lilac | 0.144 | 2,630 | 13.9 | 187 | | 11.5 | 0.85 | 8.3 |
| African Red | 0.201 | 2,620 | 15.0 | 206 | 1.35 | Na | Na | Na |
| African Tropicale | 0.11 | 2,640 | 18.8 | 258 | 1.32 | Na | Na | Na |
| Azul Aran BM | 0.29 | 2,590 | Na | 1,036 | 4.1 | 92 | 1.09 | |
| Belfast Black | 0.08 | 2,940 | Na | 270 | 1.12 | 25 | Na | 4.58 |
| Bertanie Black | 0.07 | 2,980 | Na | 265 | 1.26 | 22 | Na | 5.47 |
| Blue Perl | 0.05 | 2,710 | Na | 243 | Na | 16.5 | 0.1 | Na |
| Camelia Pink | 0.18 | Na | Na | 279 | Na | 20.69 | Na | Na |
| Crystal Brown | 0.090 | 2,650 | 17.7 | 268 | 1.10 | 15.8 | 0.33 | 5.47 |
| Darwin Brown | 0.16 | 2,710 | Na | 207 | Na | 11 | | |
| Desert Rose | 0.15 | 2,630 | 16.2 | 296 | 0.99 | 14.8 | 0.42 | 5.70 |
| Edelweiss | 0.11 | 2,640 | 18.8 | 258 | 1.32 | | | 6.51 |
| Emerald Perl | 0.30 | 2,680 | Na | 213 | Na | 12.9 | 0.8 | |
| Montana Green | 0.09 | Na | Na | 188.7 | Na | 162.6 | Na | |
| Ocean Blue | 0.13 | Na | Na | 201.4 | Na | 164.3 | Na | 4.87 |
| Rustenburg Grey | 0.09 | 2,920 | Na | 245 | 1.30 | 26 | 0.24 | 3.8 |
| Tunas Green | 0.48 | Na | Na | 108 | 0.68 | Na | 1.33 | |
| Verde Mare | 0.19 | 2,680 | Na | 170 | 1.39 | 16 | 0.11 | 3.41 |

FIGURE 7

AUDIO DEVICE HAVING DENSE SOUND ENHANCING COMPONENT

RELATED PATENT APPLICATION

This application claims the benefit of the filing date of provisional patent application No. 60/491,058, for an Audio Device Having Dense Shell, filed Jul. 30, 2003, the disclosure of which is incorporated herein by reference, as though recited in full.

FIELD OF THE INVENTION

The invention relates to an audio device having a dense shell, and more particularly, to a music generating device including acoustic instruments and audio speakers, with further particularity, the invention relates to a stone veneer for a string instrument such as a piano, guitar, bass, banjo, Dobro™ and lapsteel guitar, and the like.

BACKGROUND OF THE INVENTION

It is well recognized that wood, in particular aged wood, makes an ideal material for such musical instruments such as a piano, violin, guitar, or the like.

SUMMARY OF THE INVENTION

Figure 3:
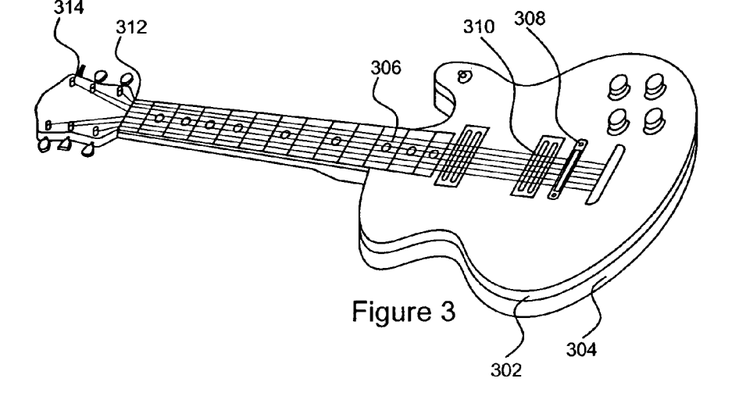
FIG. 3 is another view of the guitar showing the granite laminated or otherwise bonded to a wood core.
Figure 4:
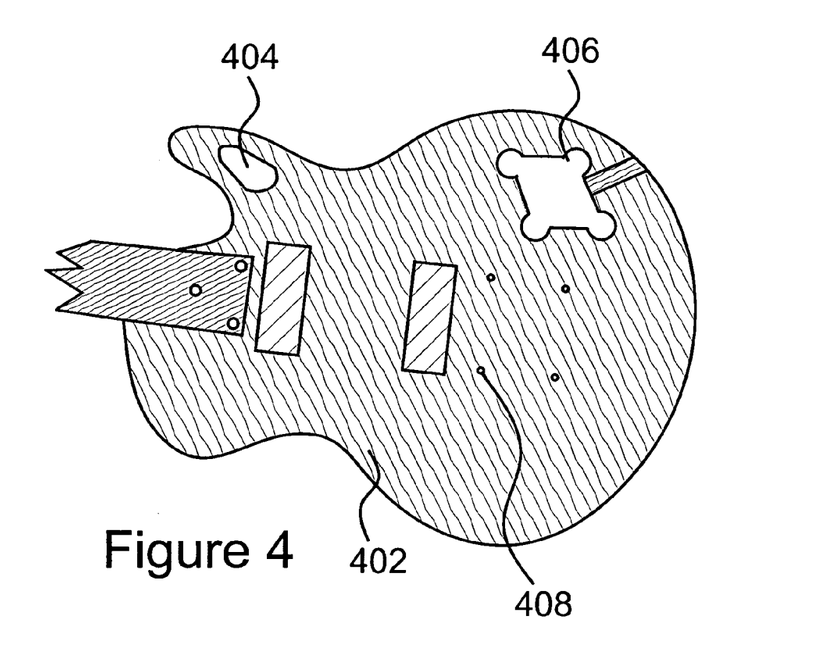
FIG. 4 is a partial top view of wood core of the guitar.

It has now been found that in one aspect of the invention stone can be used as a resonating surface for an acoustical device, such as a musical instrument. With many such instruments, weight of the instrument is a critical factor. For example, musicians generally reject guitars that weigh over 8 or 9 pounds. Similar weight limitations apply to other string instruments, such as banjos, mandolins, violins, and the like. An instrument such as a piano generally does not have a weight limitation from the standpoint of a performer but practical considerations limit the weight of pianos. Although a material such as granite would not resonate in a manner comparable to wood, it has now been found that providing a wooden instrument with a veneer of granite produces dramatic acoustic benefits. It should be understood, that when reference is made to a veneer, it is not intended to be inclusive of a mere thin, decorative layer, such as typically made from materials such as wood, metal, paper or plastics. The veneer must be of sufficient mass to function as an acoustic material. For an instrument like a guitar, the veneer is preferably in the range from about ⅛ to ¹¹⁄₁₆ of an inch. The weight, in combination with the other instrument component must be no more than nine pounds and preferably no greater than eight pounds. Most preferably, the total weight of a guitar is no greater than eight pounds. Thus, the basic components are maintained at a minimum weight and the dense acoustic veneer provides the additional weight to bring the weight of the instrument to the desired maximum weight. The weight of the veneer, as for example, granite, is at least two pounds and preferably, at least three pounds, but no greater than five pounds. While this is preferable for a standard size guitar, other instruments can use either heavier to lighter weights of material. It should be evident that the mass of the dense acoustic layer is far in excess of that which would be used for mere decorative purposes. Stated another way, the veneer layer has sufficient mass to function as an acoustic resonating material. The dense acoustic veneer does additionally provide the functional advantage of high durability and dramatic aesthetic appeal. In some instances, the veneer can be thinner than noted above, in combination with a block of granite to provide the desired resonance qualities. A block of granite can be secured, as by an epoxy, to the interior of the guitar, most preferably at the bridge. Clarity of the sound, volume, and the ability to sustain notes are among the benefits derived from a granite veneer 302, wood core 402 stringed instrument. Although reference is made in particular to granite, other natural occurring stone materials can be used with varying benefits. The term stone is used herein to include such materials as marble, limestone, terrazzo, soapstone, porphyry, agglomerate, cobblestone, and slate. With varying benefits, the dense veneer can be any natural stone such as granite or similar stones.

A soft stone such as soapstone is relatively easy to cut or machine, but produces a result that is audibly distinguishable from granite. Additional, granite is hard and extremely durable. The extreme density and hardness of granite are factors in granite having a high sound transmission speed.

Figure 1:
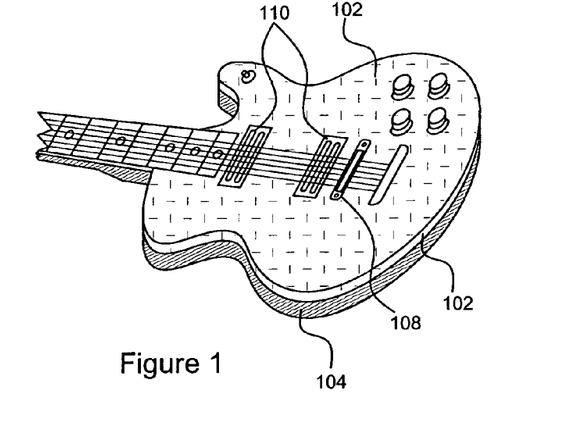
FIG. 1 is a fragmented perspective view of the guitar showing the granite laminated or otherwise bonded to a wood core.

It has now been found that the formation of a relatively thin veneer of granite 102, when bonded to a wood core 104, forms a remarkable high quality material for musical instruments.

Similarly, the bonded material has similar benefits, when used for musical speakers and are extremely effective with the high frequency range of tweeters. The veneer is preferably about one quarter of an inch thick for an instrument such as a guitar and can be thicker for an instrument such as a piano, where weight is less critical.

With progressively thinner layers, the acoustical benefits are modified, but the durability of the instrument, that is, resistance to surface scratches and the wear and tear of use, are retained. The various granites, typically identified by their color, have different acoustical properties, and the preferred thickness can be different for different color granites. As previously noted, at a half inch, excessive weight problems can be encountered for some instruments. The finish to the granite can be sandblasted or highly polished, or inlaid with decorative items.

Figure 2:
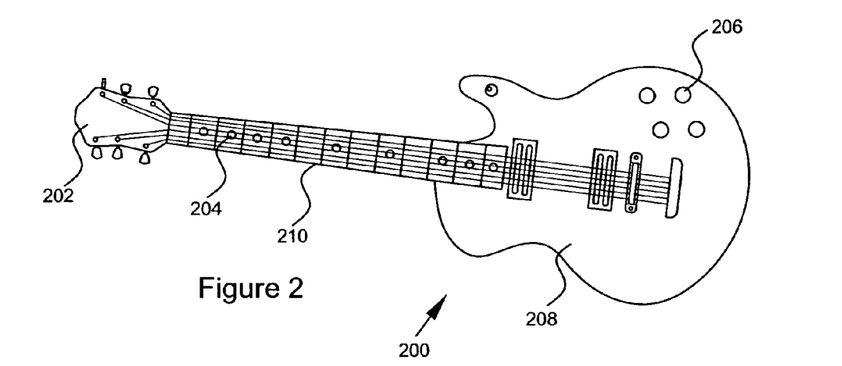
FIG. 2 is a top view of the granite cut to a thickness of about an eighth inch and contoured to match the wood core.

In respect to a guitar, the granite 102 is preferably laminated or otherwise bonded to a wood core 104, such as illustrated in FIG. 1. The granite 208 of FIG. 2 is cut to a thickness of about an eighth inch and contoured to match the wood core. Additional sound enhancement is obtained by epoxying a granite block at the bridge. The granite layer is then epoxy bonded to the wood. A soft bonding agent, such as silicon, is not preferred because of its tendency to dampen the sound wave. The granite veneer can be used for the headstock 202 of the guitar as well as for the face side of the guitar body 208. Additionally it can be used on the fret board 210 as an inlay 204.

In a speaker, the entire body of the speaker can be formed of the stone, such as granite, since weight is not a negative factor. The unique factor of using a thin veneer or laminate structure is less applicable to speakers than to musical instrument due to the absence of a weight limitation, though the combination of a core material such as wood or dense board and stone, such as granite, is also preferred for speaker housings.

Obviously, the stone surfaced musical instrument preferably has a flat body, as is typical for acoustic guitars and electric guitars. "F" hole guitars and Spanish guitars with curved bodies, can be veneered with granite, using currently available technology.

EXAMPLE I

A flat bodied Dean guitar model Cadillac X with two double hummbuckers bolt on neck-standard guitar. The thickness of a granite slab was modified to provide the desired thickness, in preparation for adhesion of the granite to wood. The back of the guitar was planed as well as the tuning peg head stock material. The head stock laminate was one-eighth inch.

After planing the granite face to a 5/8" thickness, the control lines were laid out to line up all the main factors of the guitars action and intonation.

The holes 206 were then produced for the volume and tone knobs. The 3-way pick up switch hole was provided with a different hole diameter than the other holes.

Figure 5:
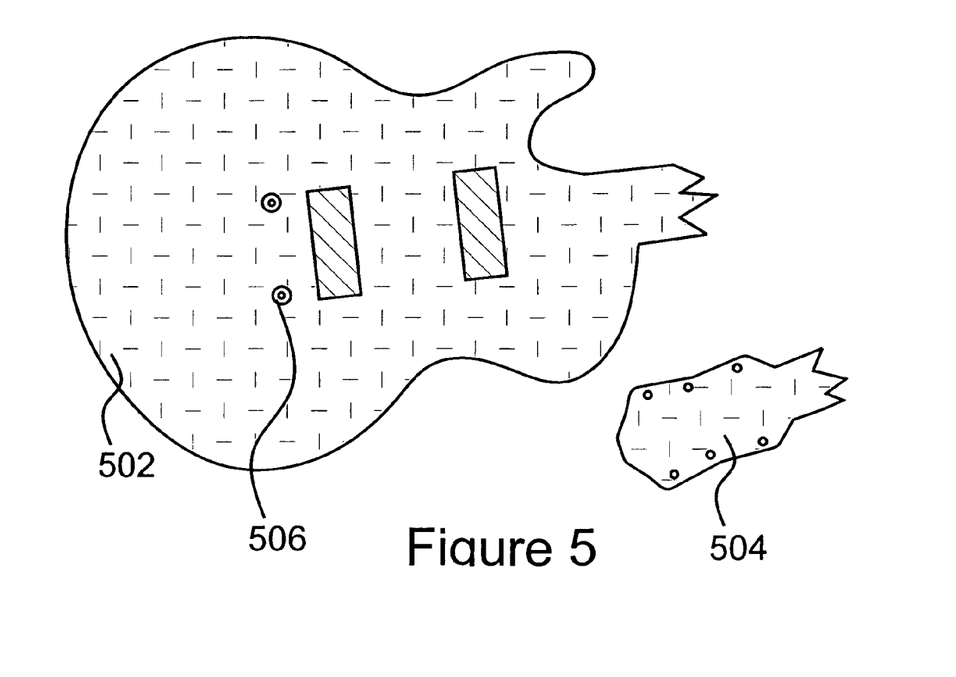
FIG. 5 is a fragmented top view of the granite laminate contoured to match the wood core.

The next step was to determine the depth to be routed in the electronic cavities 404 and 406 for the: volume, tone, and the three-way selector switch (inclusive of pots). One of the most important steps was to determine the bridge post placement, and angle to achieve a precision intonation for bridge placement. Two metal studs and two metal inserts 506, are inlayed through the granite laminate face 502, for the tunamatic standard bridge system (a non-tremolo system), and the wood body 408. The next step was to determine the holes to be drilled and placed through the whole body for the string through body method of string placement.

The strummed guitar with the granite acoustic layer produces a significantly louder, punchier, more ambient sound than a strummed guitar without the granite acoustic layer. The resonation of the strings 306 vibrates the peg headstock 202, therefore, vibrating the granite layer 504. The holes for the strings-through-body design were angulated for string tension and looks. The way it works is: the ball of the string is anchored under the wood, strung through the wood, upward through the granite, angled over the granite laminate face, over the tune-amatic bridge 308, up the fret board 210, over the nut 312, through the tuning post 314, and wrapped around the post 314. The post is mounted to the granite and wood laminate.

A piano presents a related though somewhat different acoustical factors than a guitar. A critical element of the piano is the soundboard. It is believed that the tonal output of any piano, with no cracks in the soundboard at all, is subject to vastly greater change with every change in temperature and humidity. The alternate absorption and evaporation of moisture affects the soundboard, and therefore the tone of the piano, to a far greater degree than any crack or accumulation of cracks. The use of a very low porosity stone, in particular, granite, significantly counters this problem by virtue of the very low sensitivity to moisture and temperature. The benefits attributed to the use of granite for guitars, are also applicable to the use of granite in pianos. U.S. Pat. No. 3,091,149 disclosure relating to wrest plates.

Method of Manufacture

The key component of the invention is the use of stone as a resonating surface for musical instruments, particularly stringed musical instruments like guitars, violins, basses, banjoes, pianos and the like, as well as other sound producing devices like speakers and amplifiers. It has now been found that providing such sound producing devices with a relatively thin veneer of granite, stone or the like, when bonded to a wood core, forms a remarkably high quality material for such musical instruments with dramatic acoustical benefits. Similarly, the stone in either a solid or bonded form has similar benefits when used for musical speakers and is extremely effective with the high frequency range of tweeters.

Note that the veneer is not a thin, merely decorative layer adhered to the wood, but a veneer of sufficient thickness and density to function as an effective acoustical resonating mass. For example, in an instrument like a guitar, where weight is a critical factor, the soundboard veneer is in the range from about $7/64$ to $48/64$ths of an inch. Preferably, the veneer is in the range from one pound to four pounds with the more highly preferred range being 24 ounces to 48 ounces. The thickness of the veneer is related to the mass of the veneer. That is, in a small guitar the veneer can be thicker than in a large bodied guitar, where the total weight of veneer material is about the same. The veneer is preferably at least about $7/64$ of an inch thick up to about $48/64$ of an inch. The more highly preferred range is about $10/64^{th}$ to about $20/64^{th}$ of an inch. The weight is most preferably in the range from about 24 ounces to about 40 ounces. In the preferred embodiment, the veneer thickness is selected such that the desired weight range is maintained. It should be noted that the use of too little mass will fail to produce the desired end result. Additionally, it should be noted that veneer can be applied to the head or other parts of the guitar in order to provide additional mass. Further, blocks of granite can be used in combination with the bridge, the tremolo bridge, and/or the pickup. Additionally, granite sound connecting rods can acoustically link the neck to the bridge or another component or components.

Although reference is made in particular to granite, other naturally occurring stone materials such as marble, limestone, terrazzo, soapstone, agglomerate, etc. can be used with varying benefits depending upon the unique resonating qualities and characteristics of the stone selected. In particular, granite with its wide range of colors, density, and composition offers a broad spectrum of acoustical benefit options for sound enhancement. In addition, it has now been found that the extreme density and hardness of granite make it an optimal material for high sound transmission speed and produces results that are superior to those attained with less dense stone or synthetic materials. Granite is also preferred for its very low moisture absorption properties.

Lastly, it has now been found that the replacement of various components of a string-musical instrument (e.g.: pickup trays, tremolo block, string block, headstock, nut, pick etc.) with stone materials produces equally dramatic enhancement to the stock musical instrument's sound qualities.

Below, by way of example, the basic steps and considerations involved in producing a "rock guitar" are outlined as follows:

Step I—Selection of the Components of a Stock Musical Instrument for Enhancement guitars are of three basic varieties (i.e.: electric, bass and acoustic). Additionally, within each category, different brand and model guitars are noted for their unique sound reproduction qualities and versatility due to the use of varying materials, electronics, bridge, tremolo, body, neck, and stringing designs. We have described four electric guitars below by way of example:

Gibson Les Paul (GLP): The GLP has an all mahogany neck and body, maple laminate soundboard surface and a rosewood or ebony fret board, with double hum-bucking pickups. The GLP is known for its versatility (i.e.: rock, country, heavy metal, jazz and blues) and strong low-end. The GLP's great low-end sound is largely due to the use of dense mahogany wood and a through-set neck design connecting the neck and body. The electronics consist of a double coil, "hum-canceling" hum-bucking pickup, and a 3-way pickup selector switch. Most GLP's have a "tune-a-matic standard stop bar tailpiece" bridge. (Exhibit "Granite Enhancements")

Fender Stratacaster (Strat): The Strat body consists mostly of ash, alder and bass woods. The bolt-on neck is made mostly from maple with a maple and rosewood fret board. The electronics consist of three single coil pickups and a three pickup, 5-way selector switch. The Strat has strings through the back of the guitar, through the tremolo block and up through the string saddles. Most Strats have "fulcrum pivotal tremolo bridges". The Strat is know for its strong mid-range, clean, poppy, sloppy, pristine sound and for giving the player real versatility in sound selection.

Fender Telecaster (Tele): The Tele body consists of ash, alder, and bass woods. Its bolt-on neck is made of maple with maple or rosewood fret boards. The electronics consist of two single coil pickups and three way switching. The Tele is known for its strong, distinctive high-end with its patented pickup tray that sits on top of the guitar body. The bridge pickup inserts through the top of the tray, thus forming a single integrated unit.

Edward Van Halen-Peavey Signature Wolfgang Special (EVH/WS): The EVH/WS body is made of a figured maple top and basswood back. The bolt-on neck and fingerboard are made of rock maple. The electronics consist of two double hum-bucking pickups, one volume control, and 3-way selector switch, all made from chrome. The pick-ups mount/screw directly to the body of the guitar. The EVH/WS has a "double locking, Floyd Rose tremolo" system. The sonic range of the EVH/WS falls between the GLP and Strat. The EVH/WS produces high mids and high lows and is an excellent example of a mainstream, rock-oriented guitar.

Once a musical instrument has been selected for enhancement (e.g.: we selected the EVH/WS because of its clean, punchy, bright sound), we next decide what type and range of sound qualities of the selected instrument we are going to enhance. (e.g.: with the EVH/WS our design objective was to enhance the already existing full spectrum of tone as well as to "beef-up" the bass range and depth.) Then, we evaluate which components of the selected musical instrument need to be modified (i.e.: fabricated out of stone/granite) to produce the desired sound/resonance effect. Following is a list of the basic components of a guitar that are potential candidates for enhancement:

|  | guitar type | | |
| --- | --- | --- | --- |
| Component | Electric | Bass | Acoustic |
| Soundboard | X | X | X |
| Fingerboard | X | X | X |
| Pick-up Trays | X | X | N/A |
| Tremolo Block | X | N/A | N/A |
| String Block | X | X | N/A |
| Headstock | X | X | X |
| Nut | X | X | X |
| Sound Connecting Rods | X | X | N/A |

In the EVH/WS modification, we chose to enhance the following areas: soundboard, pick-up tray, tremolo block, and string block. In addition, we added stone/granite "sound transfer rods", which are embedded underneath the stone/granite pickup trays, and are designed to connect said pickup trays and pickups to the base of the neck as well as to the tremolo block and tremolo system and to the soundboard. Thus, all of the critical components of the guitar, which produce or receive the compression, vibration, and resonance from the instrument, are grounded or embedded in stone/granite. It has now been found that the use of stone/granite, with its optimal high sound transmission speed, in this capacity to ground and connect these critical components produces a balanced, compressed, naturally equalized sound, with minimal distortion.

Step II—Selection of the Type and Pattern of Stone/Granite for the Enhanced Components Once we have selected the stock musical instrument (SMI) to be enhanced, theorized the objective of the enhancement and identified the SMI's components for enhancement, we are ready to select the stone/granite for each of the "to be enhanced" components. In this regard, there are two primary considerations in selecting the stone/granite to be used: 1) acoustical benefits—the sound resonation characteristics of the selected stone/granite and 2) aesthetic benefits—the appearance, color, and veining patterns of the selected material.

1) Rock and Rock Formation

Rocks are classified into three major classes, each according to the geological process from which they evolve: igneous, sedimentary, and metamorphic. Igneous rocks are formed from molten magma. When the magma cools and solidifies above the earth's surface, it is called extrusive or volcanic rock or lava. When the magma cools below the surface, it is called intrusive or plutonic rock. The rock adjacent to these intrusions is transformed by the hot gases, liquids and vapors generated by the magma. Thus, the mineral composition and structure of an adjacent limestone formation will be transformed into a higher grade of marble.

Plutonic Rock has solidified at depth under great pressure and is composed of an interlocking crystalline matrix of visible mineral grains large enough to be seen. Often the different mineral crystals contrast with each other to provide a magnificent visual effect. The lattice structures (crystallographic forms) taken by these chemical components are numerous and are determined by the type and quantity of minerals present, and the pressure and temperature of the environment in which they evolve (Note: Many minerals are polymorphic. That is, though their chemical composition is the same, they may evolve into two or more physically distinct crystal forms, depending upon the environment in which they are precipitated (e.g.: calcium carbonate precipitates as both aragonite and calcite)). Generally, all plutonic rocks can take a polish and are often mistaken for marble. Examples of plutonic rock used for decorative purposes include: Granite, Syenite, Diorite, Monzonite, Granodiorate, Gabbo and Diabase (Black Granite).

Sedimentary Rock is formed from the minerals and rock debris of igneous rocks as they are broken down over the ages by geological processes. Sedimentary rocks can be thought of as the foundation for natures formation of marble.

Metamorphic Rock is formed from sedimentary or igneous rock that has been subjected to intense pressure and/or temperature that has transformed its crystalline structure/texture, density, coloring, and other characteristics.

2) Composition and Resonance Qualities of Granite

Although all rock offers unique appearance and resonance qualities, we have selected the granites, by way of example, to discuss in this regard, because of its broad range of colors, appearance, density, and resonance qualities.

Figure 6:
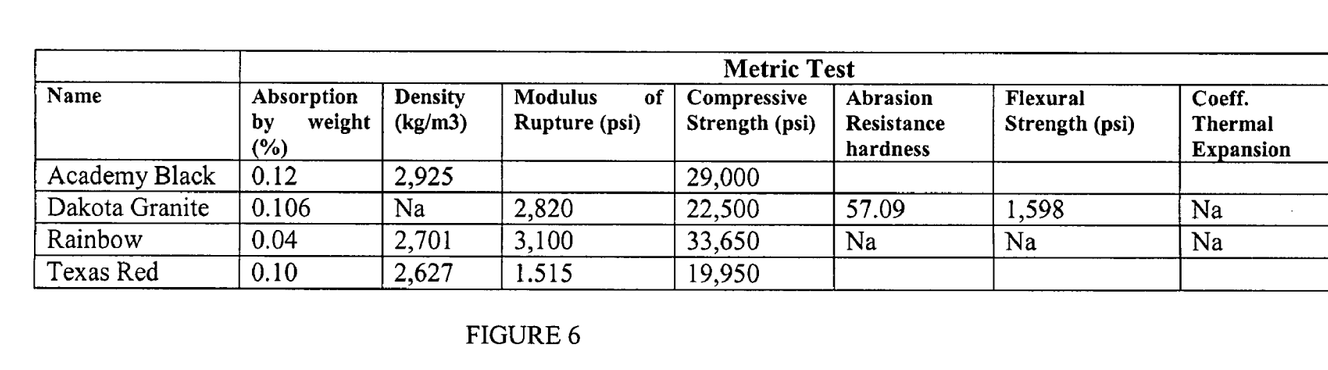
FIG. 6 is a chart showing granite densities using a standard metric test.
Figure 7:
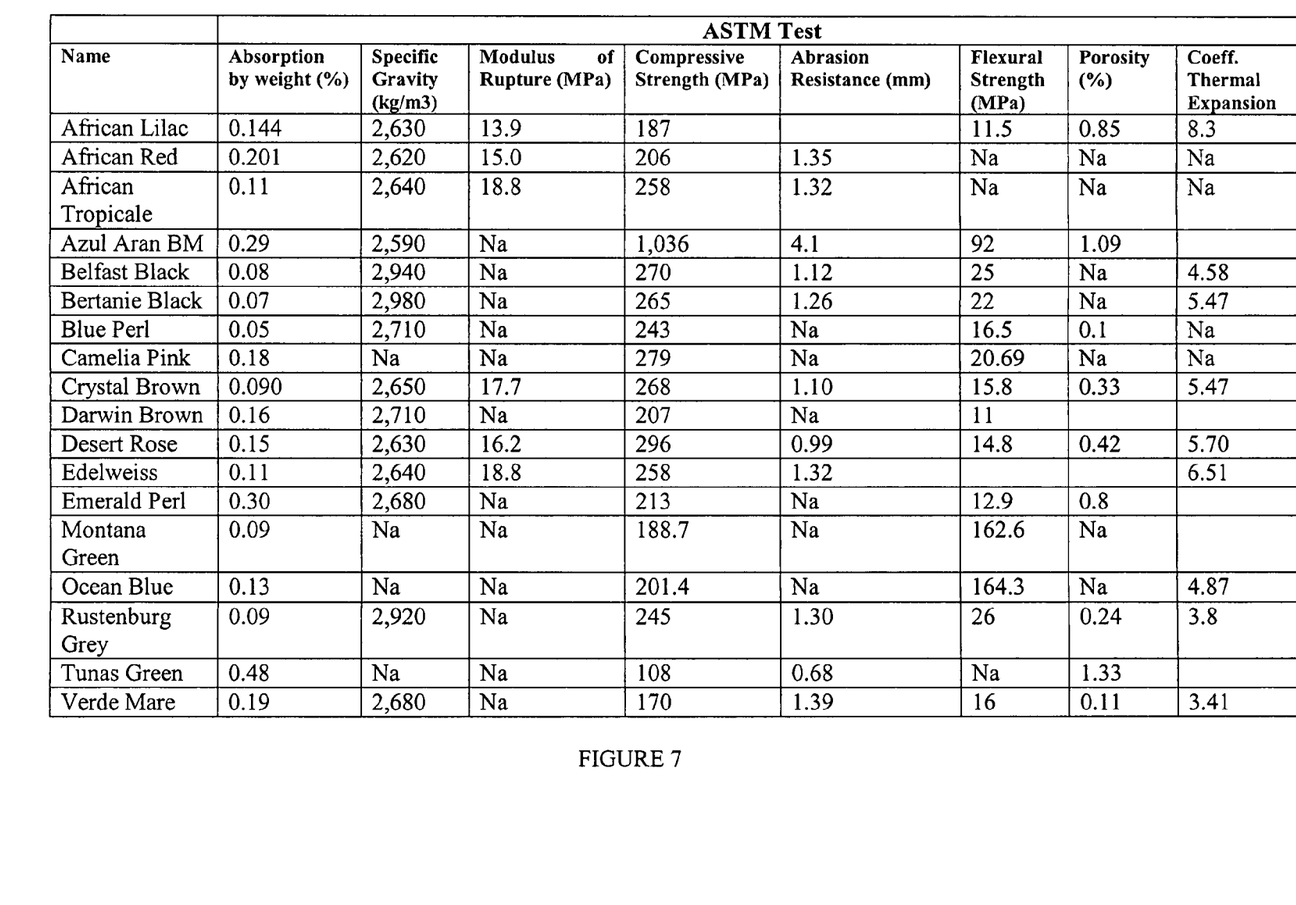
FIG. 7 is a chart showing granite densities using a standard ASTM test.

Granite is quarried in a wide array of colors and patterns from all over the world and, generally, is composed of four basic crystallized minerals:

- Quartz—consists of silica or gold
- Mica—glittering mineral of scales or plates
- Feldspars—crystalline mineral forming granite and other rocks
- Hornblende—mineral composed of silica, magnesia, lime, or iron Typical Granite Colors and Mineral Composition categorizes into three color groups (light, medium and dark) some of the most popular granites and, further, describes the typical mineral composition of each color group. The densities for various granites are shown in FIGS. 6 and 7.

- Light Color/Minerals—The light granites consist of a lot of quartz like minerals that are more flexible and mixed with crystalline type minerals that make these granites soft and less dense. The majority of the minerals in the lighter granites are softer and more absorbent than are found in the medium and dark granites. These "soft" granites tend to gently complement and enhance the existing musical instruments sound qualities, resonance and sustain.
- Medium Color/Minerals—The medium granites consist of a higher percentage of quartz, feldspars, and magna than the lighter group. There is a much wider variety of color and composition in this grouping than any other group. In addition, many of the granites in this grouping have dark tones mixed in with the more common earth tones. These granites in particular tend to lend more clarify and resonance to the low bass tones. A general enhancement to the full range of tones is quite noticeable with the use of this grouping of granites.
- Dark Color/Minerals—The dark color granites consist of large amounts of lava or magma. These dark mineral granites are the densest and heaviest materials available in the granite spectrum. We now know that from the dark, dense granites resonates a distinctive big bass sound and, thus, these colors are used to enhance the deeper, base tones of a musical instruments.

3. Selection of the Type and Pattern of Granite for the EVH/WS

With the EVH/WS, our design objective was to enhance the already existing full spectrum of its tone as well as to "beef-up" the bass range and depth. Thus, we picked a medium color and density granite called Juparana Casablanca for the soundboard, because it consists of "softer" minerals compared to the darker colors of granite. The Juparana Casablanca mass is about 20% quartz, which is the densest of all the minerals in this color group. Aesthetically, this granite is a beautiful blend of multi-colored minerals—gold, rust, tope, white, black, tan, and gray. Additionally, the veining of the particular piece selected for the soundboard follows the guitar's radius, giving the completed instrument a visual effect like the rings around the planet Saturn.

We selected from the dark granites, the densest stones available, to enhance and "beef-up" the bass range of the EVH/WS. From these extremely dense, hard materials, we selected as follows: for the pick-up trays, we selected Black Absolute because of the minimal amount of iron ore content, which we felt otherwise might interfere with the magnetics of the pickups, and for the tremolo block and sound transfer rods, we selected Black Galaxy because of its high zinc and copper mineral content and their related grounding characteristics.

Step III—Milling the Stone/Granite

Weight is a primary design concern in the modification and enhancement of stringed musical instruments with stone/granite veneers and implants. For example, in an instrument like a guitar, where weight is a critical factor, the soundboard veneer is preferably in the range from about $1/8$ to $11/16$ of an inch thick. In the manufacture of pianos and speakers, where weight is less of a critical consideration, the veneers can be thicker or even solid with no wood base being used. Thus, the milling of the granite from the raw slabs is a critical step in the making of a granite guitar.

The "raw" granite is quarried and shipped from processing plants all over the world as a $1¼$ to $¾$ inch slab, polished on one side and untreated on the other side, except for resins needed for filling the voids in the stone prior to finishing the factory polish.

In the making of a guitar, there are two basic types of modification that we make to the stock musical instrument: 1) bonding a veneer of milled stone/granite to the surface of the stock musical instrument in areas like the soundboard or headstock, where weight is a critical concern and 2) embedding a block of milled stone/granite into the body of the musical instrument (e.g.: tremolo block, string block, pickup trays, sound connecting rods) to ground and connect with stone the critical sound producing components of the instrument (e.g.: tremolo system, strings, pickups, neck). An overview of both of these processes follows:

1) Milling the Stone/Granite Veneer

When making the soundboard or headstock, we need to bring the stone thickness from standard sizes, typical $1¼$ or $¾$ of an inch, down to the desired thickness that is in the range from about $⅛$th to $⅜$ths of an inch, depending upon the design specifications. This is a multi-step, milling process of the backside of the raw stone piece that involves using a bridge saw and a diamond stone-planeing blade.

By way of example, for the EVH/WS soundboard, we cut a 22 inch by 36 inch piece of Juparana Casablanca, a medium color/density granite, from a $¾$ inch thick "raw" slab. This piece was cut intentionally about 30% bigger than the final soundboard, giving the "water-jet" operator enough stone, on either side of the design layout, to secure the stone during water-jetting process, the next step.

Before we begin the multi-step process of milling the soundboard to the desired thickness, first, we cut a "sister" piece of stone about 30% larger than the soundboard piece. Next, we plane the backside of the "sister" piece of stone to eliminate any thickness or flatness imperfections in the raw slab. Then, the "sister" piece is secured to the bridge saw table bed, polished side up. Lastly, we fasten with hot glue the soundboard piece, face to face (i.e.: polish to polish), to its "sister" piece. Now, we are ready to begin the "rough-cut" milling process on the bridge saw, whereby we mill the "raw" stock to $⅜$ths of an inch.

Once the "rough-cut" milling process is complete, we free the soundboard from its "sister" piece and clean it with water. Next, we thoroughly dry the soundboard at 85° in a drying rack. Then, we apply a nitro solvent to clean and "open the pores" of the granite.

When milling the stone below $⅜$ths of an inch (the "fine-cut" milling), great care must be taken to minimize the potential for slab breakage, particularly for the "softer" medium and light granites. Granite has distinct veining that are natural fissures or cracks in the stone, where the stone is structurally the weakest. Therefore, as a preventative measure, when the milling process gets below the $⅜$ths of an inch range, it is necessary to apply to the surface of the stone a penetrating resin to fill these fissures and cracks and to give added strength to the ⅜ inch slab before continuing the milling process.

Before applying the penetrating resin, the soundboard is heated to 85°, so that it will draw the extra thin, penetrating resin deep into its "pores". The soundboard is allowed to thoroughly soak in the penetrating resin and is dried in such a manner that about ⅛th of an inch of extra resin residue remains on the surface of the dried soundboard. Then, the stone can be milled again and, if necessary cleaned/dried/penetrated again, until the desired milling thickness is achieved.

Once the stone is milled to the desired thickness, the slab is again cleaned/dried/penetrated to strengthen it before the final milling step is completed. This step is a final grinding process done to eliminate the lines and groves that remain after the "fine-cut" milling is completed. The grinding is performed with diamond-cut, wet wheel mounted on a pneumatic grinder. This fine grinding of the groves and lines gives the stone the flatness critical to ensure that the fit between the backside of the milled soundboard or headstock and the wood core of the modified musical instrument is within very tight tolerances.

Lastly, a final penetrating coat is applied, allowed to dry, and sanded with 120-diamond grit paper. At last, we are ready to have the soundboard water-jetted.

2) Milling the Block Granite Components

A variety of "block" stone/granite pieces are embedded into the modified musical instrument body (e.g.: tremolo block, string block, pickup trays, sound connecting rods) to ground and connect with stone the critical sound producing components of the instrument (e.g.: tremolo system, strings, pickups, neck). These components are rough cut and milled using the bridge saw and a diamond-cutting blade.

Step IV.—Cutting, Shaping, and Finishing the Stone/Granite Components

Once the stone/granite components are milled (See Step III.), they are ready to be cut, shaped, sealed, polished, stained, and waxed.

1) Water-Jetting/Cutting

Water-jetting technology is used to cut those stone pieces were exact precision cutting or piercing is critical. For the string blocks, precision holes as small as 0.04 of an inch in diameter are required. With the soundboard and headstock components, we provide the water-jet operator with an exact template of the shape, cutouts and piercing desired. The operator then loads this data into the machines memory. Then a series of pre-cuts are performed using ⅛th inch sheet metal until the exact accuracy and alignment are achieved. Then, the stone is cut. Any minor adjustments are performed with a Dremel diamond cutting tool and assorted bits.

2) Shaping the Exposed Edges

Once the water-jetting is complete, the edges in particular of the thin veneer components are very fragile, rough, and prone to chipping. Therefore, a special precaution is taken to minimize the potential for chipping or breakage during the final shaping and polishing steps. An A-B epoxy layer approximately ⅛th of an inch thick is applied to the perimeter edging of the piece to add extra strength during these final finishing steps. Then, after all of the edge work is completed with diamond sandpaper on an electric grinder, any remaining excess epoxy is sanded off using a 120 diamond grit sandpaper.

3) Polishing the Exposed Edges

Once the rough shaping work is completed above, the edges are final shaped successively with a diamond cup wheel and 24 grit, 60 grit and 120 grit diamond stones. This step removes most of the scratches from the shaping step and prepares the surface to be water polished. Next, the edges are polished with water polishing pads of, successively, 150, 300, 500, 1000, 2000, 3000, and 8500 diamond grit 4) Staining Staining is done to enhance and brighten the crystals, transparency, iridescent and tone of the stone. Once the areas for color enhancement have been identified and marked, the surface is heated with a torch so that the stone with draw in the stain more readily. The desired color dye is mixed with a little sealer, making and ink-like mixture. This mixture is spread on the desired areas with a razor blade and allowed to soak in and dry. Then, the excess is scraped off with a razor blade. Any remaining excess stain is removed with acetone and a clean rag.

5) Sealing

The sealing of the stone would normally be performed after the water-jetting or cutting process. However, because of the very fragile nature of the thin veneers and small insert blocks being used, we prepare and seal the stone for a guitar before the "rough-cut" milling step. When sealing the stone, first, the component is washed with water and dried. Next, it is prepared with medium steel wool using a pneumatic line sander. Then, it is cleaned with a nitro solvent cleaner. Last, the component is sealed with two coats (wet-on-wet) of a premium silicon impregnator.

6) Waxing

A Diamond Wax is next applied to the enhanced components. This wax paste is applied evenly to the finished surface of the piece and allowed to dry for one-half an hour.

The surface is then treated with medium, steel wool using an in-line pneumatic sander. Last, a super fine steel wool is used with the pneumatic sander. Sufficient heat is produced during this process to literally burn the excess wax off of the surface of the stone, leaving the remaining wax in an almost crystalline state. The resulting luster and shine that results from this process is spectacular, like the sheen on a red candy apple.

Step V—Preparing the Stock Musical Instrument to Accept the Stone Enhancements

Next, the stock musical instrument needs to be prepared to accept the stone enhancements. By way of example, with the EVH/WS guitar, we enhanced the soundboard, pick-up trays, sound transfer rods, and tremolo block. All of these areas of the stock guitar are water-jetted, milled, or routed out using a variety of saws, routers, drills, and shapers. The milling and routing for these enhanced stone components is performed within very close tolerances so that the amount of glue material needed during the bonding process is minimized.

Step VI—Bonding the Soundboard and Other Stone Components to the Modified Musical Instrument In the making of a guitar, there are two major types of bonding processes: 1) bonding the thin, stone veneer enhancements (e.g.: soundboard, headstock, etc.) to the modified musical instrument and 2) embedding and bonding the stone block enhancements (e.g.: pick-up trays, tremolo block, string block, sound connecting rods, etc.). Each is discussed briefly below:

1) Bonding the Stone Veneer Enhancements

The critical challenge in bonding the stone veneer to the modified wood core of the musical instrument, which is also referred to as acoustically adhering wherein the stone veneer is adhesively bonded to the modified wood core of the instrument, is a) to minimize any voids or gaps in the bonding process, so ideally we have 100% contact between the soundboard or neck stock and the wood base, 2) to use the absolute minimum amount of bonding agent, so that we absolutely minimize the amount of "foreign" material (i.e.: epoxy) needed between the stone and the wood, and c) to eliminate the need for mechanical clamping, so as to minimize the probability of breaking the fragile veneer components.

In this regard, we developed a unique bonding technique to achieve both of these objectives. Simultaneously, the wood core base is heated to a temperature of approximately 120°, while the granite soundboard is chilled to a temperature of approximately 28°. Next, the A-B epoxy (i.e.: A=catalyst, B=body) is prepared. The A and B chemicals are first mixed separately on 10"×10" pre-heated pieces of "work" granite and then, put in the microwave to solidify the structure of the glue. After being "nuked", the A and B parts are mixed thoroughly. Next, the epoxy is cooled at 28° for about 5 minutes to slow and neutralize the chemical interaction. This process not only optimizes the A-B mixing process, but also increases the "set-up" work time of the epoxy. Now, the epoxy is ready to be applied to the wood core and related veneer component.

First, the epoxy is applied to the chilled stone veneer. Then, the epoxy is applied to the heated wood core. The epoxy is applied very, very thinly to both component's surfaces using a specially designed, razor-edge applicator. When the heated and chilled components are aligned and touch, a vacuum-like effect occurs drawing the hot surface and its epoxy to the cold surface and its epoxy. Essentially a natural uniform bonding of the two surfaces with minimal voids and gaps and virtually, no need for mechanical clamping is attained.

Last, we make any final adjustments to the alignment of the two surfaces. The cooling of the epoxy after mixing provides about 10 minutes of critical alignment time before the bond is too tight to adjust. Preferably, the setting time of the epoxy is in the range from 5 to 15 minutes to provide sufficient time to adjust the positioning of the two components without unnecessarily extending the processing time. Alternatively, the laminate can be shaped and processed after the bonding step thus eliminating the need to provide a significant time for the positioning of the two materials.

2) Bonding the Stone Block Enhancements

The block enhancements (e.g.: bridge block, string block, tremolo block, pickup trays, sound connecting rods) are attached to the wood core using the same bonding technique described in Section 1, above. The receiving cavities have been prepared with minimal clearance tolerances so that only a very thin coat of epoxy is necessary for bonding the surfaces together. All of these components are designed to "ground" and connect to the underside of the soundboard or neck, so that we have optimal sound transmission between all of the critical sound-producing components of the musical instrument.

Step VII—Reassembling, Tuning and Testing the Enhanced Musical Instrument

Lastly, the musical instrument is reassembled. The neck is reattached, if applicable, and aligned. The electronics (e.g.: pickups, switches and toggles, etc.) are reattached and rewired. The tremolo system is reassembled, if applicable. The instrument is restrung and then tested.

Piano

Pianos are sensitive to humidity changes due to wood being hygroscopic. The use of granite in place of critical wooden components, such as the sound board, can render pianos acoustically insensitive to humidity changes.

DEFINITIONS

Terms employed herein are used in accordance with the following definitions: Acoustic or acoustical 1. Of, or relating to sound, the sense of hearing, or the science of sound. 2. Designed to carry sound or to aid in hearing.

As employed in the present case, the term acoustic, when used in conjunction with a specific instrument, such as a guitar, does not exclude an instrument that features electronically modified sound, and thus includes electric guitars. Additionally, the term is inclusive of non-electronically amplified or enhance guitars as well as electronically modified sound producing devices such as synthesizers, electronic key boards and the like, provided the dense acoustic material is employed in conjunction with the sound generation component of the device. In the case of a string instrument, it is in direct acoustic contact with the strings, and in the case of an electric keyboard or synthesizer, it is in acoustic contact with the loudspeaker or other sound transducer device.

Granite—A common, coarse-grained, light-colored, hard igneous rock consisting chiefly of quartz, orthoclase or microcline, and mica, used in monuments and for building.

Stone—Concreted earthy or mineral matter; rock. Such concreted matter of a particular type. Often used in combination: sandstone; soapstone. 2. A small piece of rock. 3. Rock or a piece of rock shaped or finished for a particular purpose, especially: A piece of rock that is used in construction: a coping stone; a paving stone.

Rock 1. Relatively hard, naturally formed mineral or petrified matter; stone. 2. A relatively small piece or fragment of such material. A relatively large body of such material, as a cliff or peak. 3. A naturally formed aggregate of mineral matter constituting a significant part of the earth's crust.

Locking Nut—The locking nut has slots for the strings to rest in along with three allen screws that are used to tighten and loosen the three clamps.

Tremolo Bridge—The tremolo bridge may or may not be used in conjunction with a locking nut. Once the strings are tuned to pitch, the locking nut is clamped down and the fine tuners are used to precisely tune the strings the rest of the way. Clamping down on the strings will usually result in the strings slightly rising in pitch.

H/SC—Used to describe the pickup configuration. This stands for humbucker, single-coil configuration. May be different with every guitar.

FR—Floyd Rose tailpiece.

Hardtail—Guitar without a tremolo system. Also known as a fixed bridge.

Bolt-on neck—The most common type of guitar. Neck and body are two pieces joined at the top of the guitar body with screws.

Granite is a common and widely-occurring group of intrusive felsic igneous rocks that forms at great depths and pressures under continents. Granite consists of orthoclase, plagioclase quartz, homblende, biotite, muscovite and minor accessories such as magnetite, garnet, zircon and apatite minerals. Rarely a pyroxene is present. Ordinary granite always carries a small amount of plagioclase, but when this is absent, the rock is referred to as alkali granite. An increasing proportion of plagioclase feldspar causes granite to pass into granodiorite. A rock consisting of equal proportions of orthoclase and plagioclase plus quartz may be considered a quartz monozonite. A granite containing both muscovite and biotite micas is called a binary granite.

Average density: 2750 kg/m³ (range 1741 to 2800)

Lyre

The wooden structure supporting the pedals and pedal rods on a grand piano.

Bridge

There is a bridge at each end of the speaking length of the strings—one on the iron frame, and one on the soundboard. There are generally three bridges altogether, two on the soundboard and one on the iron frame. Sometimes on the iron frame there may be agraffes or studs instead. Bridge and bridgepins, located on top of soundboard Cabinet—The external wooden part of a piano. This is the common term for vertical pianos.

Case: The rim case consists of an outer and inner part. The frame and soundboard are attached to the inner rim. A good piano will consist of an outer rim and inner rim as one whole. However, on many pianos, the outer rim consists of different wood, and is attached to the inner rim case. Typical wood for the case is maple, spruce, and beech.

Lid—The wooden part of the piano cabinet that covers the top of the piano.

Spine The straight side of a grand piano stretching from the keyboard to the end of the piano.

Frame

This is cast iron, usually gold painted. It takes the tension of the strings. It is very heavy, and needs to be, for acoustical reasons. Old and new pianos are heavy. Hence, a heavy piano does not indicate it is an obsolete design—it is a feature of the best modern instruments.

Plate—The iron framework where strings are attached.

Wrest Plank

The wooden laminated plank into which the wrest pins (tuning pins) are inserted.

Wrest Pins

The tuning pins, inserted into the wrest plank.

Braces The thick wooden braces at the bottom (grands) or back (uprights) of the piano are not as acoustically important as the rim, and are often made of a softwood, even in top-quality pianos, in order to save weight.

Soundboard

The soundboard, a thin piece of fine-grained spruce placed under the strings, reinforces the tone by means of sympathetic vibration.

The part of the piano where materials probably matter more than anywhere else is the soundboard. In quality pianos, this is made of solid spruce (that is, spruce boards glued together at their edges). Spruce is chosen for its high ratio of strength to weight. The best piano makers use close-grained, quarter-sawn, defect-free spruce, and make sure that it has been carefully dried over a long period of time before making it into soundboards. In cheap pianos, the soundboard is often laminated; i.e. made of plywood. The wooden (spruce) sound amplifying structure inside the piano, across which the strings are tensioned. Usually made of Sitka spruce wood, and about ⅜" thick. The soundboard serves to amplify the sound produced by the vibrating strings. The wood has the correct balance of thickness and flexibility to efficiently transmit sound. The soundboard is bowed slightly upward towards the strings to maintain compression. This keeps it from caving under the pressure of the strings, and allows for a more vibrant sound to be produced. The treble strings are attached to the long curving bridge, while the bass strings are attached to the shorter one. (The top view of soundboard). The bridge then transmits the vibrations from the strings to the soundboard.

Top Door

This is the 'lid' at the top of an upright piano.

Fallboard—Wooden structure that covers the keys of modern pianos. Sometimes used as a sound source in modern music.

The requirement of structural strength, fulfilled with stout hardwood and thick metal, makes pianos heavy. Even a small upright can weigh 300 pounds (136 kg.), and the Steinway concert grand (Model D) weighs 990 pounds (480 kg). The largest piano built, the Fazioli F308, weighs 1520 pounds (691 kg).

What is claimed is:

1. A method of manufacturing an audio device having an acoustic layer of stone bonded to a wooden substrate, said method comprising the steps of:
   a. milling a stone piece to a required thickness;
   b. cleaning at least one pore of said stone;
   c. applying a penetrating material to said stone;
   d. removing excess penetrating material, if any, from a surface of said stone;
   e. processing the surface of said stone and said wood layer to matching tolerances to provide substantially complete surface-to-surface contact wherein one of said wood layer and said stone layer is heated to above ambient temperature and the other of said wood layer and said stone layer is cooled to below ambient temperature and said wood layer and said stone layer are bonded together while one of said wood layer and said stone layer is above ambient temperature and the other of said wood layer and said stone layer is below ambient temperature;
   f. applying a flowable adhesive to the surface of at least one of said wood layer and said stone;
   g. removing excess adhesive, if any, from said surface of said at least one of said wood layer and said stone; and
   h. acoustically adhering said wood layer to said stone layer.

2. The method of claim 1, wherein said stone is heated to a temperature of at least about 120 degrees F. and said wood layer is cooled to a temperature below about 50 degrees F.

3. The method of claim 2, wherein said wood layer is cooled to a temperature at least as low as 32 degrees F.

4. The method of claim 1, wherein said stone is a veneer having a thickness in the range from about ⅛ to 1 inch.

5. The method of claim 1, wherein said adhesive is a two part epoxy, and wherein said epoxy has a set time of between 5 and 15 minutes.

6. The method of claim 1, wherein said excess adhesive is removed from said surface of said at least one of said wood layer and said stone, with a blade.

7. The method of claim 1, wherein said penetrating material is a resin that fills pores, fissures and cracks.

* * * * *